United States Patent [19] [11] 4,139,872
Tachi [45] Feb. 13, 1979

[54] VIDEO SIGNAL REPRODUCING APPARATUS WITH A TRACK SEARCHING ARRANGEMENT

[75] Inventor: Katsuichi Tachi, Kawasaki, Japan

[73] Assignee: Sony Corporation, Tokyo, Japan

[21] Appl. No.: 833,709

[22] Filed: Sep. 15, 1977

[30] Foreign Application Priority Data

Sep. 15, 1976 [JP] Japan ................................ 51-110387

[51] Int. Cl.² ...................... G11B 15/18; G11B 17/02
[52] U.S. Cl. ......................................... 360/72; 360/10
[58] Field of Search .............................. 360/10, 72, 73

[56] References Cited

U.S. PATENT DOCUMENTS

| 3,229,035 | 1/1966 | Bounsall | 360/10 |
| 3,681,523 | 8/1972 | Sidline | 360/72 |
| 3,789,138 | 1/1974 | Terada | 360/10 |
| 3,968,517 | 7/1976 | Chimura | 360/10 |
| 4,040,098 | 8/1977 | Beeson | 360/10 |
| 4,066,872 | 1/1978 | Karp | 360/72 |

Primary Examiner—Jay P. Lucas
Attorney, Agent, or Firm—Lewis H. Eslinger; Alvin Sinderbrand

[57] ABSTRACT

In an apparatus in which video signals recorded in successive parallel tracks extending obliquely across a magnetic tape are reproduced by means of at least one rotary magnetic head which scans the tracks in succession at a rate dependent on the speed at which the tape is moved longitudinally by a tape transport assembly; a track searching arrangement is provided that includes a selector actuable for selecting a track searching mode of the apparatus, a manually rotatable wheel or dial, and a control circuit for initially establishing transport of the tape in the forward direction at a normal speed upon actuation of the selector, and for thereafter varying the speed and direction of transport of the tape from the initial speed and direction in accordance with the direction and angular extent of any rotation of the wheel from the position of the latter at the time of selection of the track searching mode.

16 Claims, 6 Drawing Figures

VIDEO SIGNAL REPRODUCING APPARATUS WITH A TRACK SEARCHING ARRANGEMENT

BACKGROUND OF THE INVENTION

1. Field of the Invention

This invention relates generally to apparatus in which video signals recorded in successive parallel tracks extending obliquely on a magnetic tape are reproduced by means of at least one rotary magnetic head which scans the tracks in succession at a rate dependent on the speed at which the tape is moved longitudinally by a tape transport assembly, for example, as in a so-called VTR, and more particularly is directed to providing such apparatus with an improved track searching arrangement by which the tape can be accurately and rapidly positioned for scanning of a selected track by the rotary head or heads.

2. Description of the Prior Art

When an existing magnetic video tape recorder or VTR of the helical scan type is operated in its reproducing or playback mode with a time base corrector, the speed at which the tape is transported or moved longitudinally between the supply and take-up reels may be varied while the rotary magnetic heads are rotated at the frame frequency so as to provide, on a monitor, a still, slow-motion or fast-motion reproduced picture in dependence on the speed of movement of the tape. Existing VTRs have been provided with a so-called joy-stick control knob or lever in addition to the usual playback or reproduce push button. When the playback push button is depressed, the normal reproducing or playback mode is established during which the tape is transported in the forward direction at a normal or standard speed. When the track searching mode of the apparatus is selected, the speed and direction of movement of the tape are determined by the extent and direction, respectively, of angular displacement of the joy-stick control knob or lever from a neutral position corresponding to no movement of the tape. A VTR provided with the foregoing joy-stick control knob or lever may be used for arbitrarily selecting a particular track on the tape at which a recording or reproducing operation is to be commenced, as during editing of the tape. The high speed movement of the tape in one direction or the other can be effectively achieved by a corresponding large angular displacement of the control knob or lever from its neutral position so as to bring a roughly desired portion of the tape to the position for scanning of the tracks thereon by the rotary head or heads, whereupon, the angular displacement of the control knob from its neutral position is reduced for correspondingly slowing down the movement of the tape and observing the successive pictures displayed by the monitor until a particular or desired field or frame of the video signals is located, at which time the tape movement is halted by returning the joy-stick control knob to its neutral position.

However, in the above described existing apparatus, the joy-stick control knob is associated with a variable resistor or a multi-contact switch included in the circuit for controlling the direction and speed of movement of the tape, and it has been found that such variable resistor or multi-contact switch is a source of frequency difficulties or defects in operation due to insufficient electrical contact between its relatively movable parts so that the existing apparatus is burdened by relatively poor reliability and a short operating life.

Further, in the described existing apparatus, the speed and direction at which the tape is driven upon selection of the track searching mode is determined by the position of the joy-stick control knob or lever at the time such selection is made. Accordingly, if the apparatus is changed-over from its playback mode to its tape searching mode at a time when the joy-stick control knob is disposed at a position corresponding to a fast movement of the tape in the forward or reverse direction, the resulting fast movement of the tape at the commencement of the tape searching operation may result in the uncontrolled movement of the tape pass the point at which the tape movement is to be halted for editing or for still-motion reproduction. Accordingly, in the existing apparatus, it is necessary to preset the joy-stick control knob to its neutral position for halting the movement or transport of the tape, or to the position of the knob corresponding to transport of the tape in the forward direction at the normal or standard speed, prior to change-over of the apparatus from its playback or reproducing mode to its track searching mode. Thus, the existing apparatus can be troublesome and relatively complicated to operate.

OBJECTS AND SUMMARY OF THE INVENTION

Accordingly, it is an object of this invention to provide a video signal playback or reproducing apparatus with a track searching arrangement that is free of the above mentioned disadvantages of the prior art.

More particularly, it is an object of this invention to provide a video signal reproducing apparatus with a track searching arrangement having improved reliability and ease of operation.

Another object is to provide a track searching arrangement, as aforesaid, in which, upon change-over from the normal reproducing or playback mode to the track searching mode, the tape is initially transported in the forward direction at the normal speed for playback or reproducing and, thereafter, the speed and direction of movement of the tape can be varied at will from the normal forward speed in response to turning of a manually rotatable wheel or dial.

Still another object is to provide a track searching arrangement, as aforesaid, in which a momentary resistance to further rotation of the control wheel or dial arises when, during a track searching operation, the control wheel or dial has been rotated to a position for halting movement of the tape as for editing or still-motion reproduction of the video signals, with the result that the operator is apprised of the attainment of still-motion reproduction by the momentary resistance to rotation of the wheel or dial.

A further object is to provide a video signal reproducing apparatus, as aforesaid, with an indication of the speed and direction of movement of the tape, at least when the apparatus is in its tape searching mode, for facilitating the operation of the apparatus in such mode.

In accordance with an aspect of this invention, in an apparatus in which video signals recorded in successive parallel tracks on a magnetic tape are reproduced by means of a magnetic signal sensing means, such as, a rotary magnetic head, which scans the tracks in succession at a rate dependent on the speed at which the tape is moved longitudinally by a tape transport assembly; a track searching arrangement is provided with a selector actuable for selecting a track searching mode of the apparatus, a manually rotatable wheel or dial, and control means for establishing an initial predetermined speed and direction of transport of the tape by the tape transport assembly upon actuation of the selector and for thereafter varying the speed and direction of the transport of the tape from the initial speed and direction in accordance with the direction and angular extent of any rotation of the wheel or dial from the position occupied by the latter at the time of actuation of the selector for selecting the track searching mode.

In the preferred embodiment of the invention, the above mentioned control means includes a presettable up-down counter, means for determining the direction and speed of transport of the tape by the tape transport assembly in dependence on the count of the counter, means responsive to actuation of the selector for presetting the counter to a predetermined count, for example, corresponding to movement of the tape in the forward direction at the normal playback or reproducing speed, means for generating pulses in response to rotation of the control wheel or dial, and means for detecting the direction of rotation of such wheel and correspondingly causing the counter to effect the up-or down-counting, respectively, of the pulses starting from the predetermined count to which the counter has been preset.

The above, and other objects, features and advantages of the invention, will be apparent in the following detailed description of an illustrative embodiment thereof which is to be read in connection with the accompanying drawings.

DESCRIPTION OF A PREFERRED EMBODIMENT

Figure 1:
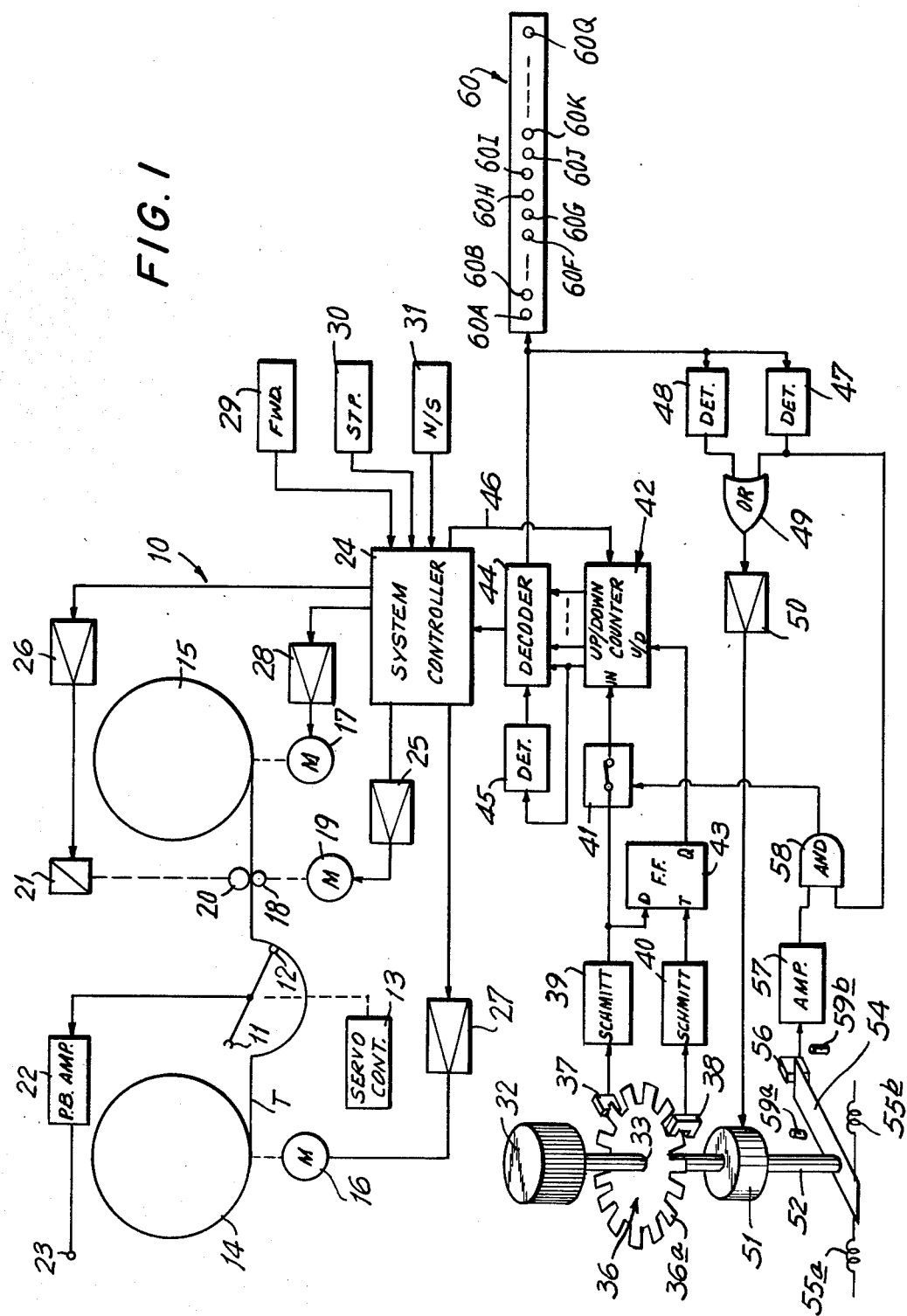
FIG. 1 is a schematic view illustrating the essential components of a video signal reproducing apparatus provided with a track searching arrangement in accordance with an embodiment of this invention.

Referring to the drawings in detail, and initially to FIG. 1 thereof, an apparatus 10 for reproducing video signals recorded in successive parallel tracks extending obliquely across a magnetic tape T is there shown to include a pair of diametrically opposed rotary magnetic heads 11 and 12 which are rotated at the standard frame frequency of the video signals. For example, heads 11 and 12 may be rotated at a speed of 30 revolutions per second, in the case of NTSC video signals, by means of a servo control circuit 13 which synchronizes the rotation of the heads with vertical synchronizing pulses from an external synchronizing circuit (not shown). The tape T is shown to be wound on rotatable supply and take-up reels 14 and 15, and the run of tape T between reels 14 and 15 is suitably guided to extend helically around approximately one-half of the periphery of a guide drum (not shown) associated with rotary heads 11 and 12 so that the latter will alternately scan obliquely across the tape.

The video reproducing apparatus 10 is further shown on FIG. 1 to have a tape transport assembly including reversible electric motors 16 and 17 coupled with reels 14 and 15, respectively, for driving the latter, a capstan 18 engageable with tape T at a location along the latter between take-up reel 15 and the position where the tape is alternately scanned by heads 11 and 12, a motor 19 for driving capstan 18, and a pinch roller 20 which, upon energizing of an associated solenoid 21, is operative to press the tape against capstan 18 for transport of the tape by the rotated capstan.

As is usual, one field of video signal information may be recorded in each of the successive parallel tracks extending obliquely across tape T and, in the normal reproducing mode of operation of apparatus 12, rotary heads 11 and 12 are made to alternately scan the successive parallel tracks and thereby reproduce respective fields of recorded video signal information. The signals reproduced by heads 11 and 12 are supplied through a reproducing or playback amplifier 22 to an output terminal 23 which may be connected to a television monitor (not shown) for displaying the reproduced video pictures.

The motors 16, 17 and 19 and the solenoid 21 are controlled by a system controller 24 for determining the speed and direction of movement of tape T. When the speed of movement of the tape is to be in the range from 0 to the normal speed for recording and playback or reproducing, an alternating voltage of a frequency corresponding to the desired tape speed is supplied from system controller 24 through an amplifier 25 to capstan motor 19 for driving the latter at a speed corresponding to the desired tape speed, and, simultaneously, system controller 24 applies a voltage through an amplifier 26 to solenoid 21 for energizing the latter. Thus, tape T is moved at the desired speed by the cooperative action of rotated capstan 18 and pinch roller 20. Furthermore, system controller 24 supplies suitable voltages through amplifiers 27 and 28 to motors 16 and 17, respectively, with such voltages being determined so that motor 17 will be made to drive take-up reel 15 in the direction to wind the tape thereon at a speed corresponding to the speed of movement of the tape by rotated capstan 18, while motor 16 will be made to drive supply reel 14 in the direction to unwind the tape therefrom at a slightly slower speed, whereby to provide a desired tension in tape T between the reels.

When the tape is to be moved or transported at a speed greater than the normal recording and playback or reproducing speed, system controller 24 de-energizes motor 19 and solenoid 21 so that capstan 18 is inoperative to drive the tape, and the speed and direction of movement or transport of the tape is then dependent only upon the voltages applied from system controller 24 through amplifiers 27 and 28 to motors 16 and 17 for driving the associated reels 14 and 15.

As shown schematically on FIG. 1, the system controller 24 of apparatus 10 is provided with a mode selecting push-button 29 actuable to establish the reproducing or playback mode of operation in which tape T is moved or transported from supply reel 14 to take-up reel 15 at the same normal or standard speed as was used for the recording of signals on the tape, and a push-button 30 which is actuable for establishing the stop mode, that is, halting the playback operation.

Figure 4:
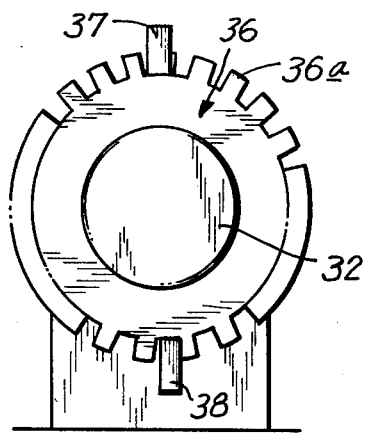
FIGS. 4 and 5 are opposite end elevational views, respectively, of the device shown on FIG. 3.
Figure 3:
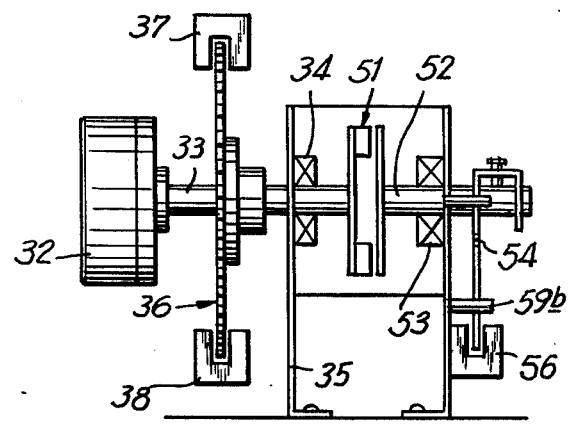
FIG. 3 is a side elevational view of a structural embodiment of a device included in the track searching arrangement of FIG. 1 and which is shown only schematically on the latter.

In accordance with this invention, the above described video signal reproducing apparatus 10 is further provided with a track searching mode of operation which may be selected or established, for example, by manual actuation of a respective push-button or selector 31 from a rest or normal position in which the tape movement may be controlled by selective actuation of the push buttons 29 and 30 or of additional push-buttons (not shown) for selecting fast-forward and rewind modes of operation of apparatus 10. In order to control the movement of tape T when the track searching mode of operation is selected by actuation of push-button 31, apparatus 10 according to this invention is shown to include a manually rotatable wheel or dial 32 mounted on a shaft 33 journaled in a bearing 34 carried by a frame 35 (FIG. 3). A photo-disk 36 is shown to be secured on shaft 33 for rotation with wheel 32, and the periphery of disk 36 is formed with spaced apart cutouts defining a substantial number, for example 120, of radially directed light shielding portions 36a between the successive cutouts. Two angularly spaced apart photo-couplers 37 and 38 are associated with photo-disk 36 so as to constitute first and second pulse generators providing first and second pulse signals of different phases, with the phase relation of such first and second pulse signals being dependent on the direction of rotation of wheel 32. More particularly, each of the photo-couplers 37 and 38 may include a light source at one side of the plane or rotation of disk 36 directing a light beam across the peripheral portion of the disk toward a respective photo-cell or other light-receiving element at the opposite side of the plane of rotation. Thus, when disk 36 is rotated with wheel 32, the light beam emitted from each light source and directed toward the respective photo-cell is intermittently blocked by the successive light shielding portions 36a of disk 36 with the result that each of photo-couplers 37 and 38 provided an alternating signal or pulses. Furthermore, the angular spacing between photo couplers 37 and 38 is selected, particularly as shown on FIG. 4, so that the alternating signals or pulses derived from photo-couplers 37 and 38 upon turning of wheel 32 will have a phase difference of 90° therebetween. Thus, for example, during rotation of wheel 32 in the clockwise direction, as viewed on FIG. 4, the successive pulse from photo-coupler 37 may be 90° in advance of the pulses from photo-coupler 38. Conversely, during rotation of wheel 32 in the counter-clockwise direction, the pulses from photo-coupler 38 will lead the pulses from photo-coupler 37 by 90°.

The alternating signals or pulses from photo-couplers 37 and 38 are shown to be applied to Schmitt circuits 39 and 40, respectively, to be wave-shaped by the latter into corresponding rectangular wave signals. The rectangular wave signal from Schmitt circuit 39 is applied through a normally closed switching circuit 41 to the input of an up-down counter 42. Further, the rectangular wave signals from Schmitt circuits 39 and 40 are respectively applied to D and T inputs of a D-type flip-flop 43 which functions as means for detecting the direction of rotation of manually rotatable wheel 32. For example, flip-flop 43 may provide signal levels "0" and "1" at its output Q in response to turning of wheel 32 in the clockwise and counter-clockwise directions, respectively. The signal from output Q of flip-flop 43 is applied to counter 42 for controlling the direction in which such counter counts the pulses or rectangular wave signals applied thereto through switching circuit 41 from Schmitt circuit 39. For example, when the output Q of flip-flop 43 is at the level "1" in response to turning of wheel 32 in the clockwise direction, counter 42 is made to count the successive pulses from photo-coupler 37 in the upward direction; that is, each pulse is added to the previous count; whereas, when the output Q of flip-flop 43 is at the level "0", counter 42 is made to count the successive pulses in the downward direction, that is, each pulse is subtracted from the previous count.

In the illustrated embodiment, the counter 42 is shown to have a 5-bit binary content and, when power is initially applied to apparatus 10 for starting-up the operation thereof, counter 42 is reset to provide the same with the count or content [00000]. Accordingly, when dial or wheel 32 is thereafter rotated in the clockwise direction, the resulting pulses from photo-coupler 37 are counted upwardly by counter 42 so that the content or count of the latter is increased by [1] from [00000] for each pulse, as shown on FIG. 2A. On the other hand, if wheel or dial 32 is rotated in the counter-clockwise direction starting with the counter 42 having the count or content [00000], then each resulting pulse from photo-coupler 37 is subtracted from the previously existing count with the result that the content of counter 42 initially underflows to [11111] and then decreased by [1] for each pulse.

The 5-bit binary count or content of counter 42 is supplied to a decoder 44, and the highest or most significant bit of the content of counter 42 is also applied to a detector 45 which provides a detected output of "0" or "1" when the highest or most significant bit of the content of counter 42 is "0" or "1", respectively. The detected output of detector 45 is employed to control decoder 44 so that, as shown on FIG. 2B, the output of decoder 44 will be the same as the content of counter 42 so long as the highest or most significant bit of such content has the value "0". On the other hand, when the highest or most significant bit of the content of counter 42 has the value "1", the values of the lower 4-bits of the output of decoder 44 are the reverse of the values of the corresponding bits of the content of counter 42, that is, each bit having the value [0] in the content of counter 42 has the value [1] in the output of decoder 44 and, conversely, each bit having the value [1] in the content of counter 42 has the value [0] in the output of decoder 44. Accordingly, during down-counting by counter 42 of pulses resulting from rotation of wheel or dial 32 in the counter-clockwise direction, the lower 4-bits of the output of decoder 44 will increase by [1] for each pulse from the reset value [00000] with the highest or most significant bit retaining the value [1].

The output of decoder 44 is supplied to system controller 24 so as to be effective in the latter to control the direction of movement of the tape T by means of the value of the highest bit of such decoder output, while the lower 4-bits of the decoder output are effective in system controller 24 to determine the speed of movement of the tape. Thus, for example, when the highest bit of the output of decoder 44 has the value [0] tape T is transported or moved in the forward direction from reel 14 to reel 15, that is, in the same direction as during recording and normal playback, while the tape is transported or moved in the reverse direction when the highest bit of the output of decoder 44 has the value [1]. Further, the speed of movement of the tape is increased by system controller 24 in response to increases in the value of the lower 4-bits of the output of decoder 44. For example, the value [0000] of the lower 4-bits of the output of decoder 44 may correspond to a halt in the movement of the tape, as for still-motion reproduction of video signals recorded in a particular track, whereas the value [0110] may correspond to the normal speed of movement of the tape for recording and reproducing operations and the value [1111] may correspond to the highest desired speed of the tape, for example, as in fast forward or rewind operations. It will be understood from the foregoing, when considered in connection with FIG. 2B, that the speed of movement of the tape will be the same when the output of decoder 44 is [00110] as when the output of decoder 44 is [10110], but that the tape will be moved in the forward direction in the first instance and in the reverse direction in the second instance.

As indicated schematically at 46 on FIG. 1, a line extends from controller 24 back to counter 42 for applying a presetting signal to the latter by which the content of counter 42 may be preset to a predetermined value, for example, the value [00110] corresponding to the movement of the tape in the forward direction at the normal speed for recording and playback, in response to the actuation of push-button or selector 31 for changeover of the apparatus to its track searching or shuttle mode of operation.

Figure 5:
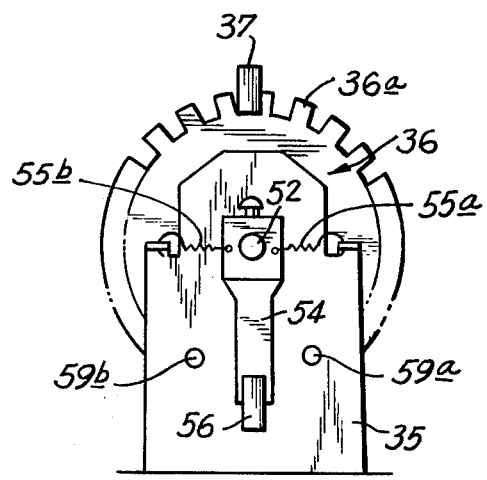

Detectors 47 and 48 are also shown to be connected to an output of decoder 44 for detecting when the lower 4-bits of the output of decoder 44 have the values [1111] and [0000], respectively, and for providing corresponding detected outputs or signals in response to the occurrence of the respective values in the output of decoder 44. The detected outputs of detectors 47 and 48 are applied to an OR circuit 49 which has an output connected through an amplifier 15 to an electro-magnetic clutch 51 (FIGS. 1 and 3). The clutch 51, when energized in response to the detected output of detector 47 or 48, is effective to rotatably couple shaft 33 with a coaxial shaft 52 journaled in a bearing 53 also carried by frame 35 (FIG. 3). An arm 54 is suitably secured on shaft 52 so as to extend radially therefrom, and springs 55a and 55b extend in diametrically opposed directions from arm 54 to anchors on frame 35, praticularly as shown on FIG. 5, for yieldably urging arm 54 to the illustrated neutral position. In such neutral position of arm 54, the free end portion thereof extends into a photo-coupler 56 which is generally similar to the previously described photo-couplers 37 and 38. Thus, in the neutral position of arm 54, the end portion of the latter blocks the passage of light from the light source to the photo-cell or other light-receiving element in photo-coupler 56 so that there is no output from the latter. On the other hand, when arm 54 is angularly displaced from its neutral position against the force of springs 55a and 55b in response to turning of wheel 32 at a time when clutch 51 is energized in response to a detected output from detector 47 or 48, the end portion of arm 54 no longer blocks the passage of light in photo-coupler 56 and the latter provides a suitable output which is supplied through a wave shaper and amplifier 57 to one input of an AND circuit 58. Another input of AND circuit 58 receives the output of detector 47, and the output of AND circuit 58 is connected to switching circuit 41 for opening the latter in response to the simultaneous occurrence of an output from detector 47 and an output from photo-coupler 56. It is further to be noted that stops 59a and 59b are provided on frame 35 (FIG. 5) at opposite sides of arm 54 for limiting angular displacements of the latter from its neutral position.

The apparatus 10 according to this invention further includes an indicator 60 for providing visual indications of the speed and direction of movement of the tape in the track searching mode of operation. The indicator 60 is shown to receive the output of decoder 44 and to have seventeen luminescent diodes 60A to 60Q which are arranged in a row and which are selectively energized in accordance with the output of decoder 44. When the output of decoder 44 is [00000] or [10000] which, as indicated on FIG. 2B, causes controller 24 to halt the movement of tape T for achieving still-motion reproducing or playback, only the central diode 60I is illuminated. For values of the output of decoder 44 between [00001] and [01111], which controller 24 responds to by causing progressively increasing speeds of movement of the tape in the forward direction, successively increased numbers of the diodes from diode 60I to diode 60Q are illuminated until, for the decoder output of [01111] corresponding to the fast-forward speed of the tape, all of the diodes 60I to 60Q are illuminated. On the other hand, for decoder outputs ranging from [10000] to [11111], and which controller 24 responds to by causing movement of tape T in the reverse direction at progressively increasing speeds, successively increased numbers of the diodes 60I to 60A are illuminated until, for the decoder output [11111] corresponding to the highest reverse or rewind speed, all of the diodes 60I to 60A are illuminated. Thus, at any time, the diodes 60A to 60Q of indicator 60 are selectively illuminated in response to the output of decoder 44 for providing a visual indication of the direction and speed of movement of the tape in the track searching mode of operation of apparatus 10.

The above described video signal reproducing apparatus with a track searching arrangement according to this invention operates as follows:

With push-button or selector 31 in its normal or rest position, actuation of push-button 29 is effective to select the normal playback or reproducing mode of operation in which controller 24 supplies voltages to motor 16, 17 and 19 and solenoid 21 for causing tape T to be moved or transported in the forward direction by capstan 18 at the normal or standard speed employed for the recording of signals on the tape. Thus, heads 11 and 12 alternately scan the successive tracks on tape T to reproduce the video signals recorded therein, and the reproduced video signals are supplied through playback amplifier 22 to output terminal 23 for display on a monitor or television receiver connected with such terminal.

Figures 2A, 2B:
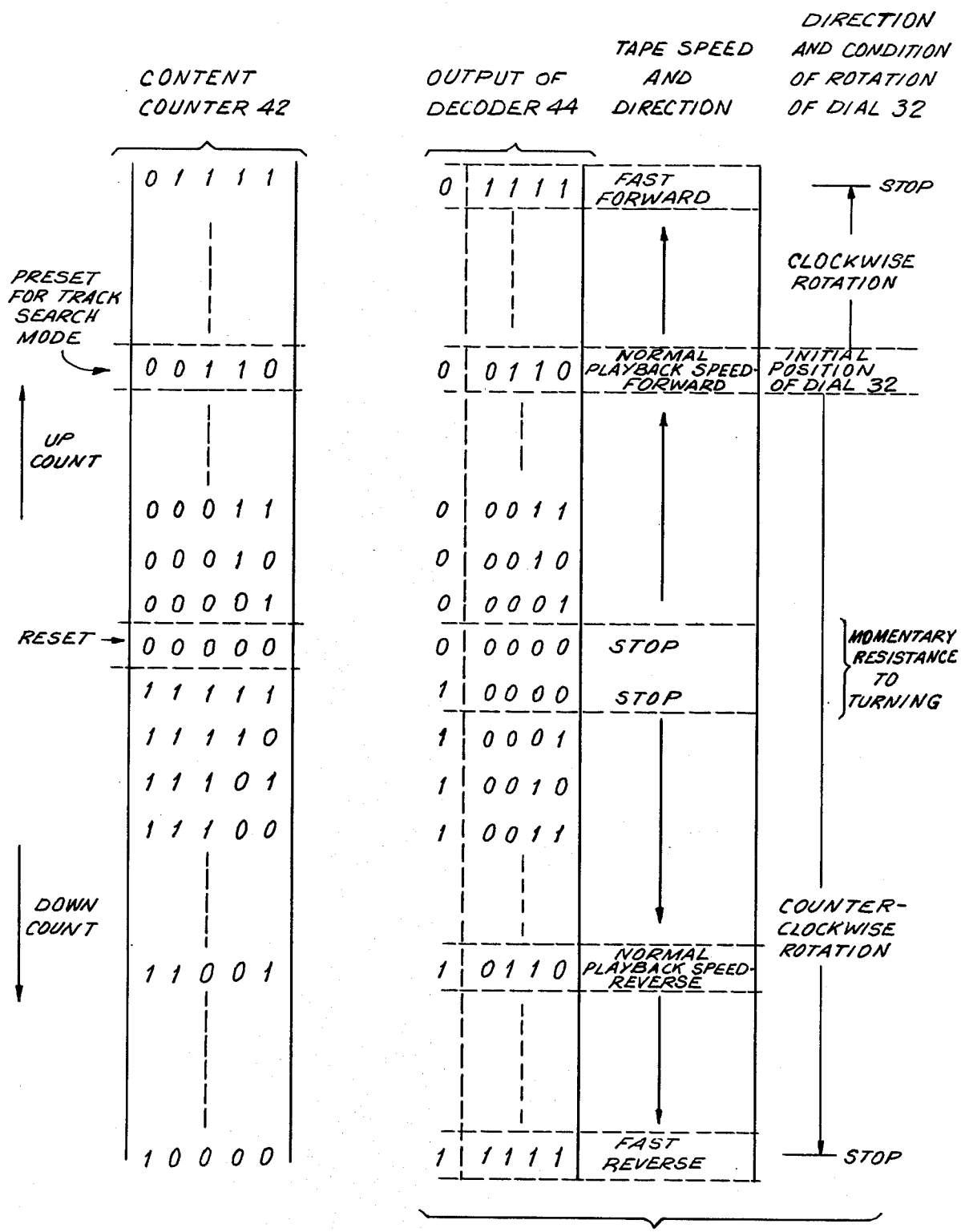
FIGS. 2A and 2B are tabular representations of the binary contents of a counter and a decoder, respectively, included in the track searching arrangement of FIG. 1, and to which reference will be made in explaining the operation of such arrangement.

When a track searching or shuttle mode of operation is desired, push-button or selector 31 is actuated and, in response thereto, controller 24 delivers a presetting signal through line 46 to counter 42 so as to set the content of the latter to the value [00110] which, as shown on FIGS. 2A and 2B, is effective through decoder 44 and controller 24 to cause forward movement of the tape at the normal or standard playback speed. Accordingly, if push-button or selector 31 is actuated for changing-over apparatus 10 from a normal playback or reproducing operation to a track searching operation, no change occurs initially in either the direction or speed of movement of the tape, that is, the normal playback operation is initially continued in the track searching mode of operation.

After the track searching mode of operation has been established, rotation of wheel or dial 32 in the clockwise direction will cause counter 42 to upwardly count the resulting pulses from photo-coupler 37 with the result that the count of counter 42 will be increased from the preset value [00110] to an extent dependent upon the angular displacement of wheel or dial 32 from the position of the latter at the time of initiation of the track searching operation. In response to increasing of the count or content of counter 42 above the preset value [00110], controller 24 causes the tape to be transported or moved in the forward direction at a speed which is correspondingly higher than the normal recording and playback speed. If wheel or dial 32 is rotated in the counter-clockwise direction after the track searching mode of operation has been established, the count or content of counter 42 is decreased from the preset value [00110] to an extent dependent on the angular extent of the displacement of wheel 32 from the position of the latter at the time of initiation of the track searching operation. Therefore, as wheel 32 is progressively turned in the counter-clockwise direction after initiation of a track searching operation, the speed of tape movement in the forward direction is progressively decreased until the tape movement is halted, whereupon further turning of wheel 32 in the counter-clockwise direction causes movement of the tape in the reverse direction at a progressively increasing speed.

Consequently, when push-button or selector 31 is actuated to change-over apparatus 10 to the track searching or shuttle mode of operation, subsequent manual rotation of wheel 32 in the clockwise direction progressively increases the speed of forward movement of the tape beyond the normal playback tape speed, with the increase in the speed of forward movement of the tape being dependent upon the angular displacement of wheel 32 from the position thereof at the initiation of the track searching operation. On the other hand, if wheel 32 is turned in the counter-clockwise direction following initiation of the track searching operation, forward slow-motion playback, still-motion playback, reverse slow-motion playback, reverse normal-playback and reverse fast-motion playback are achieved, in order, in accordance with increasing angular displacement of wheel 32 in the counter-clockwise direction from the position thereof at the initiation of the track searching operation. It will be apparent from the foregoing that, when selector 31 is actuated for change-over of apparatus 10 to the track searching mode from the normal playback mode, the playback operation is initially continued independent of the position of wheel 32 at the time when the track searching operation is commenced. Thereafter, the speed and direction of movement of the tape are dependent upon the angular extent and direction of rotation of wheel 32 from the position of the latter at the time of actuation of selector 31.

When, in the course of a track searching operation, turning of wheel 32 in the clockwise direction causes the content of counter 42 to become [01111], or turning of wheel 32 in the counter-clockwise direction causes the content of counter 42 to become [10000], that is, when the lower four bits in the output of decoder 44 become [1111], such value of the decoder output is sensed by detector 47 which provides a corresponding detector output supplied through OR circuit 49 and amplifier 50 to clutch 51 for energizing the latter. Thus, shaft 52 is rotatably coupled with shaft 33 and any further turning of wheel or dial 32 is accompanied by a corresponding angular displacement of arm 54 from its neutral position. In response to such angular displacement of arm 54, photo-coupler 56 provides an output through amplifier 57 to AND circuit 58 which simultaneously receives the detected output from detector 47 and, therefore, AND circuit 58 provides an output to switching circuit 41 for opening the latter.

As a result of the opening of switching circuit 41, when the content of counter 42 reaches the value [01111] or [10000], no further pulses can reach counter 42 from photo-coupler 37 even if wheel 32 is further turned. Thus, turning of wheel 32 in the clockwise direction can only increase the speed of forward movement of the tape to a predetermined speed corresponding to the fast-forward operation, while turning of wheel 32 in the counter-clockwise direction can only achieve a maximum speed of movement of the tape in the reverse direction corresponding to a rewind operation. It will be noted that, in both instances, that is, in the case of movement of the tape in the forward direction and in the case of movement of the tape in the reverse or rewind direction, the maximum speed of tape movement is achieved when the lower four bits of the output of decoder 44 have the value [1111].

It will also be seen that, when wheel or dial 32 is turned sufficiently in the clockwise or counter-clockwise direction to achieve the maximum tape speeds in the forward and reverse directions, espectively, in the track searching mode, the coupling of arm 54 with wheel 32 by energizing of clutch 51, as described above, ensures that such arm 54 will be engageable with stop 59a or 59b to limit further rotation of wheel or dial 32 to the extent necessary to angularly displace arm 54 away from photo-coupler 56. In other words, in the track searching operation of apparatus 10, after wheel or dial 32 has been turned in the clockwise direction to achieve fast-forward movement of the tape, further turning of wheel 32 in the clockwise direction is strongly resisted through energized electromagnetic coupling 51 and the engagement of arm 54 with one of stops 59a and 59b. However, when wheel 32 is thereafter turned slightly in the counter-clockwise direction, arm 54 is restored to its neutral position so that photo-coupler 56 no longer provides an output to AND circuit 58. Therefore, switching circuit 41 returns to its normal closed state and the pulses from photo-coupler 37 are counted down by counter 42 from the value [01111]. As soon as the lower four bits of the output of decoder 44 are no longer [1111], the output from decoder 47 is discontinued, and, accordingly, clutch 51 is de-energized for free turning of wheel or dial 32 in the counter-clockwise direction without corresponding movement of arm 54 from its neutral position. In response to the continued turning of wheel or dial 32 in the counter-clockwise direction, the content of counter 42 is progressively changed from the value [01111] toward the value [00000] and, accordingly, the speed of forward movement of the tape is progressively decreased until the tape movement is halted for still-motion playback of the video signal recorded a selected track when the content of counter 42 becomes [00000].

Further continued turning of wheel 32 in the counter-clockwise direction results in movement of the tape in the reverse direction at a speed that is progressively increased until the down-counting of pulses from photo-coupler 37 by counter 42 has resulted in the content of the latter having the value [10000], and hence in decoder 44 having the output [11111]. Such decoder output [11111] corresponds to the maximum speed of movement of the tape in the reverse direction and is sensed by detector 47 to cause energizing of clutch 51 with the result that, upon any further counter-clockwise turning of wheel 32, arm 54 is again angularly displaced and photo-coupler 56 provides the output for opening switching circuit 41. Moreover, turning of wheel 32 in the counter-clockwise direction beyond the position for moving arm 54 away from photo-coupler 56 causes engagement of arm 54 with one of the stops 59a and 59b, whereby further turning of wheel 32 in the counter-clockwise direction is strongly resisted. However, as soon as wheel 32 is returned in the clockwise direction, arm 54 again enters photo-coupler 56 to halt the issuing of an output from the latter, with the result that switching circuit 41 returns to its normal closed state and the pulses from photo-coupler 37 due to clockwise turning of wheel 32 are counted upwardly by counter 42 from the value [10000] toward the value [11111] at which the tape movement is again halted for still-motion playback of a video signal. Of course, as soon as the content of counter 42 is increased from the value [10000], detector 47 no longer senses the value [1111] for the lower four bits of the output of decoder 44, with the result that clutch 51 is de-energized to free wheel 32 for turning in the clockwise direction.

It is further to be noted that, when the content of counter 42 has the value [00000] or [11111], that is, whenever the lower four bits of the output of decoder 44 have the value [0000], such value of the decoder output is sensed by detector 48 to provide a detector output through OR circuit 49 and amplifier 50 for energizing electromagnetic clutch 51. Thus, when wheel or dial 32 is turned in one direction or the other for obtaining still-motion playback in the track searching mode of apparatus 10, as is the case when the lower four bits of the output of decoder 44 have the value [0000], arm 54 is coupled rotatably with wheel or dial 32 further turning of the wheel or dial 32 is resisted by the engagement of arm 54 with one or the other stops 59a and 59b. However, during such further turning of wheel 32, switching circuit 41 remains in its closed state so that the pulses from photo-coupler 37 are counted up or down by counter 42, with the result that the lower four bits of the output of decoder 44 are deviated from the value [0000]. As a result, the output of detector 48 is interrupted to again de-energize clutch 51 and permit the free turning of wheel or dial 32. Accordingly, in a track searching operation of apparatus 10, when wheel 32 is turned in one direction or the other through a position at which still-motion playback is achieved. there is a momentary resistance to further rotation of wheel 32 by which the operator is apprised of the attainment of still-motion playback.

It will be apparent that, in the above described apparatus 10 according to this invention, photo-couplers 37, 38 and 56 could be replaced by respective electromagnetic detecting means to provide simiilar output signals in response to turning of the wheel or dial 32 and in response to angular displacement of the arm 54 from its neutral position. Further, in the above described apparatus 10, the clutch 51 is energized only when detectors 47 and 48 respectively detect the values [1111] and [0000] for the lower four bits of the output of decoder 44, and which respectively correspond to the desired maximum tape speed in the forward of reverse direction and to halt in the movement of the tape for still-motion playback. However, an additional detector (not shown) may be provided for similarly energizing clutch 51 when the lower four bits of the output of decoder 44 have the value [0110], which corresponds to a tape speed in the forward or reverse direction equal to the normal recording and playback speed. In such case, the additional detector would act similarly to the detector 48 to cause a momentary resistance to further rotation of wheel or dial 32 beyond the position at which movement of the tape in either the forward or reversed direction at the normal recording and playback speed has been realized. Moreover, in an apparatus according to this invention, the selector 31 for changing-over from the normal playback mode to the track searching mode may be omitted and, in that case, actuation of push-button 29 is effective to achieve the normal playback mode and, thereafter, any turning of wheel or dial 32 has a dominant effect in that it changes-over the apparatus 10 from its normal playback mode to its track searching mode with the speed and direction of movement of the tape then being dependent upon the direction and angular extent of turning of wheel 32.

Although an illustrative embodiment of this invention and a few modifications thereof have been specifically described above with reference to the accompanying drawings, it is to be understood that the invention is not limited to that precise embodiment or the specifically mentioned modifications, and that various changes and further modifications may be effected therein by one skilled in the art without departing from the scope or spirit of the invention as defined in the appended claims.

What is claimed is:

1. Apparatus for reproducing video signals recorded in successive parallel tracks on a magnetic tape, comprising:

magnetic signal sensing means for reproducing the video signals recorded in each of said tracks upon positioning of said tape for scanning of the respective track by said sensing means tape transport means for transporting said tape relative to said sensing means and thereby causing the latter to scan said tracks in succession for reproducing the video signals respectively recorded therein at a rate dependent on the speed at which the the tape is transported;

track searching means including selector means actuable for selecting a track searching mode of the apparatus, and a manually rotatable wheel; and control means for establishing an initial predetermined speed and direction of transport of said tape by said tape transport means upon actuation of said selector means regardless of the instantaneous angular position of said wheel and for thereafter varying the speed and direction of said transport of the tape from said initial speed and direction in accordance with the direction and angular extent of any rotation of said wheel from the position of the latter at said selecting of the track searching mode.

2. Apparatus according to claim 1; in which said control means includes presettable up-down counting means, means for presetting said counting means to a predetermined count in response to said actuation of said selector means, means for generating pulses in response to rotation of said wheel, means for detecting the direction of rotation of said wheel and correspondingly causing said counting means to effect the up-down counting, respectively, of said pulses from said predetermined count to which the counting means is preset, and means for determining the direction and speed of transport of the tape by said tape transport means in dependence on the count of said counting means.

3. Apparatus according to claim 2; further comprising second selector means for selecting a normal forward mode of the apparatus in which the tape is transported in a forward direction at a normal speed; and in which said predetermined count to which the counting means is preset in response to actuation of the first mentioned selector means corresponds to the transport of the tape in said forward direction at said normal speed.

4. Apparatus according to claim 3; in which said control means further includes means operative for halting the counting of said pulses by said counting means when the count of said counting means has attained at least one predetermined value whereby said direction and speed of transport is held at the direction and speed corresponding to said one predetermined value.

5. Apparatus according to claim 4; in which said one predetermined value of said count for the counting means corresponds to fast-forward transport of the tape by said tape transport means, and said means for halting the counting of said pulses is further operative when the count of said counting means attains another predetermined value corresponding to fast-reverse transport of the tape by said tape transport means.

6. Apparatus according to claim 4; further comprising means operative when the count of said counting means has attained at least said one predetermined value to prevent further rotation of said wheel in the direction corresponding to changing of said count beyond said one predetermined value.

7. Apparatua according to claim 4; further comprising clutch means operative in response to said count of the counting means attaining another predetermined value for imposing a momentary resistance to rotation of said wheel.

8. Apparatus according to claim 7; in which said other predetermined value of the count of said counting means corresponds to a halt in the transport of the tape for still-motion reproduction of the video signals recorded in one of the tracks.

9. Apparatus according to claim 2; further comprising clutch means operative to impose a momentary resistance to further turning of said wheel when rotation of the latter has caused the count of said counting means to be changed from said preset predetermined count to another predetermined count.

10. Apparatus according to claim 2; further comprising indicator means responsive to the count of said counting means for indicating the corresponding speed and direction of transport of the tape by said tape transport means.

11. Apparatus according to claim 1; in which said tape is wound on supply and take-up reels and said magnetic signal sensing means scans the tape at a run thereof intermediate said reels; said tape transport mweans includes reel drive means for rotating said reels so as to unwind and wind the tape thereon, a capstan engageable with said run of the tape intermediate the reels, capstan drive means for rotating said capstan, and a pinch roller operative to press the tape against said capstan for transport of the tape by the capstan; and said control means is operative to regulate the speeds of rotation of said reel driven means and of said capstan drive means in accordance with the direction and angular extent of any rotation of said manually rotatable wheel from the position thereof upon said selecting of the track searching mode.

12. Apparatus according to claim 1; in which said control means includes presettable up-down counting means providing a count comprised of a plurality of bits with the bit of highest significance representing the direction of tape transport and the remainder of said bits representing the speed of tape transport, means of determining the direction and speed of transport of the tape by said tape transport means in dependence on said bit of highest significance and said remainder of the bits, respectively, which comprise said count of the counting means, means for presetting said counting means to a predetermined count corresponding to transport of the tape in a forward direction at a normal speed in response to said actuation of said selector means, means for generating pulses in response to rotation of said wheel, and means responsive to said pulses for detecting the rotation of said wheel in first and second opposed directions and for causing said counting means to effect the up-counting and the down-counting, respectively, of said pulses from said predetermined count to which the counting means is preset.

13. Apparatus according to claim 12; in which said means for generating pulses includes firat and second pulse generators which, in response to rotation of said wheel, produce first and second pulses, respectively, having different phases with the phase relation of said first and second pulses being dependent on the direction of rotation of said wheel; and in which said means for detecting the direction of rotation of said wheel includes flip-flop means receiving said first and second pulses and assuming a first state for causing up-counting of said first pulses by said counting means when said phase relation of the pulses corresponds to rotation of ssid wheel in a first direction, said flip-flop means assuming a second state for causing down-counting of said first pulses by said counting means when said phase relation of the first and second pulses corresponds to rotation of said wheel in a second direction.

14. Apparatus according to claim 12; in which said control means further includes normally closed switch means through which said pulses are applied to said counting means for counting by the latter, means for providing a detecting signal when the count of said counting means corresponds to transport of the tape at a predetermined high speed in the forward and reverse directions, respectively, a turnable arm normally disposed in a neutral position, clutch means actuable by said detecting signal for rotatably coupling said arm with said wheel whereupon said arm is angularly displaced from said neutral position in response to further rotation of said wheel, and means responsive to angular displacement of said arm from said neutral position during the existence of said detecting signal for opening said switch means and thereby halting further counting of said pulses.

15. Apparatus according to claim 14; further comprising stop means for limiting the angular displacement of said arm and thereby limitigg further rotation of said wheel when the count of said counting means corresponds to said predetermined high speed transport of the tape.

16. Apparatus according to claim 15; in which said control means includes means for providing a second detecting signal when the count of said counting means corresponds to a halt in the transport of the tape for still-motion reproduction of the video signals recorded in one of the tracks, and means for actuating said clutch means in response to said second detecting signal so that a momentary resistance to further rotation of said wheel is encountered when said arm abuts against said stop means.

* * * * *